(12) United States Patent
Chen et al.

(10) Patent No.: US 11,677,304 B2
(45) Date of Patent: Jun. 13, 2023

(54) OPTICAL MEMBER DRIVING MECHANISM

(71) Applicant: TDK TAIWAN CORP., Taoyuan (TW)

(72) Inventors: Sheng-Zong Chen, Taoyuan (TW);
Sung-Mao Tsai, Taoyuan (TW);
Chen-Chi Kuo, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 534 days.

(21) Appl. No.: 16/808,832

(22) Filed: Mar. 4, 2020

(65) Prior Publication Data

US 2021/0063684 A1    Mar. 4, 2021

Related U.S. Application Data

(60) Provisional application No. 62/896,943, filed on Sep. 6, 2019, provisional application No. 62/894,295, filed on Aug. 30, 2019.

(30) Foreign Application Priority Data

Dec. 20, 2019    (EP) .................................... 19218896

(51) Int. Cl.
*H02K 41/035*        (2006.01)
*H02K 5/24*          (2006.01)
*G02B 7/18*          (2021.01)
*G03B 17/17*         (2021.01)
*H02K 11/215*        (2016.01)
*G02B 7/182*         (2021.01)

(52) U.S. Cl.
CPC ......... *H02K 41/0356* (2013.01); *G02B 7/182* (2013.01); *G02B 7/1805* (2013.01); *G03B 17/17* (2013.01); *H02K 5/24* (2013.01); *H02K 11/215* (2016.01)

(58) Field of Classification Search
CPC .. G02B 7/1805; G02B 7/182; G02B 13/0065; G02B 7/1828; G02B 27/646; G02B 7/09; G02B 7/08; G02B 7/04; G02B 7/02; H02K 11/215; H02K 41/0356; H02K 5/24; H02K 2211/03; H02K 41/035; G03B 30/00; G03B 17/17; G03B 3/10; G03B 2205/0053
See application file for complete search history.

(56) References Cited

U.S. PATENT DOCUMENTS

| 2014/0177056 | A1* | 6/2014 | Hayashi | G02B 7/09 |
| | | | | 359/557 |
| 2015/0331251 | A1* | 11/2015 | Hu | G03B 5/00 |
| | | | | 359/824 |
| 2016/0316121 | A1* | 10/2016 | Park | G02B 27/646 |
| 2018/0210163 | A1* | 7/2018 | Jung | H04N 5/2254 |

* cited by examiner

*Primary Examiner* — Alexander A Singh
(74) *Attorney, Agent, or Firm* — Muncy, Geissler, Olds & Lowe, P.C.

(57) ABSTRACT

An optical member driving mechanism is provided, including a movable portion, a fixed portion, and a driving assembly. The movable portion is connected to an optical member. The fixed portion has an accommodating space, and the optical member is received in the accommodating space. The movable portion is movable relative to the fixed portion. The driving assembly is configured to drive the movable portion to move relative to the fixed portion.

17 Claims, 12 Drawing Sheets

OPTICAL MEMBER DRIVING MECHANISM

CROSS REFERENCE TO RELATED APPLICATIONS

The present application claims priority to U.S. Provisional Patent Application No. 62/894,295, filed in Aug. 30, 2019, and No. 62/896,943, filed on Sep. 6, 2019, and Europe Patent Applications No. 19218896.9, filed on Dec. 20, 2019, which are incorporated by reference herein in their entirety.

BACKGROUND OF THE INVENTION

Field of the Invention

The application relates in general to an optical member driving mechanism, and in particular, to an optical member driving mechanism configured to drive an optical member to rotate.

Description of the Related Art

Thanks to technological advancements, the latest consumer electronic devices (such as tablet computers and smartphones) now usually include a lens module capable of aiding in photography or recording video. These electronic devices have become commonplace, and have been developed to be more convenient and thin. More and more choices are available for users to choose from. However, when a lens with a long focal length is disposed in the electronic device, the thickness of the electronic device is increased, and as such it is hard to make the electronic device thin.

BRIEF SUMMARY OF INVENTION

To address the deficiencies of conventional products, an embodiment of the invention provides an optical member driving mechanism, including a movable portion, a fixed portion, and a driving assembly. The movable portion is connected to an optical member. The fixed portion has an accommodating space, and the optical member is received in the accommodating space. The movable portion is movable relative to the fixed portion. The driving assembly is configured to drive the movable portion to move relative to the fixed portion In some embodiments, the optical member driving mechanism further includes a magnetic permeability member embedded in the movable portion. The movable portion has a plurality of grooves, and the magnetic permeability member is exposed from the grooves. The longitudinal directions of the grooves are different. The movable portion has an inner surface, and the grooves are formed on the inner surface. The magnetic permeability member has a connecting portion and a curved portion connected to the connecting portion. The distance between the curved portion and the inner surface is less than the distance between the connecting portion and the inner surface. The driving assembly includes a magnet disposed on the movable portion, and at least a portion of the magnetic permeability member is adjacent to the magnet.

In some embodiments, the driving assembly includes a circuit board, and the circuit board has a U-shaped structure. The circuit board has a through hole and a circuit, and a portion of the circuit is exposed from the through hole. The coil and the circuit are connected at the through hole by welding. The fixed portion includes an opening, and the through hole is aligned with the opening.

In some embodiments, the optical member driving mechanism further includes an adhesive member filled into the opening.

In some embodiments, the driving assembly includes a circuit board and a coil, and the circuit board and the coil are electrically connected to each other using surface-mount technology.

In some embodiments, the driving assembly includes a circuit board, the fixed portion includes a housing having a C-shaped structure, and a side of the circuit board enters the notch of the C-shaped structure. The fixed portion includes a base having a first restricting portion and a second restricting portion, and the circuit board is clamped between the first restricting portion and the second restricting portion, wherein the distance between the first restricting portion and the movable portion is greater than the distance between the second restricting portion and the movable portion, and the second restricting portion has a chamfer or a fillet.

In some embodiments, the driving assembly includes a coil, and the inside track of the coil has an asymmetric pattern.

In some embodiments, the optical member driving mechanism further includes a plurality of damping members connected to the fixed portion and the movable portion, and the damping members are disposed on the side of the movable portion. The damping members are situated at the corners of the movable portion.

In some embodiments, the optical member driving mechanism further includes a dark member, the fixed portion includes a base, and the dark member is disposed on the base. The dark member extends to the position between the base and the optical member.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
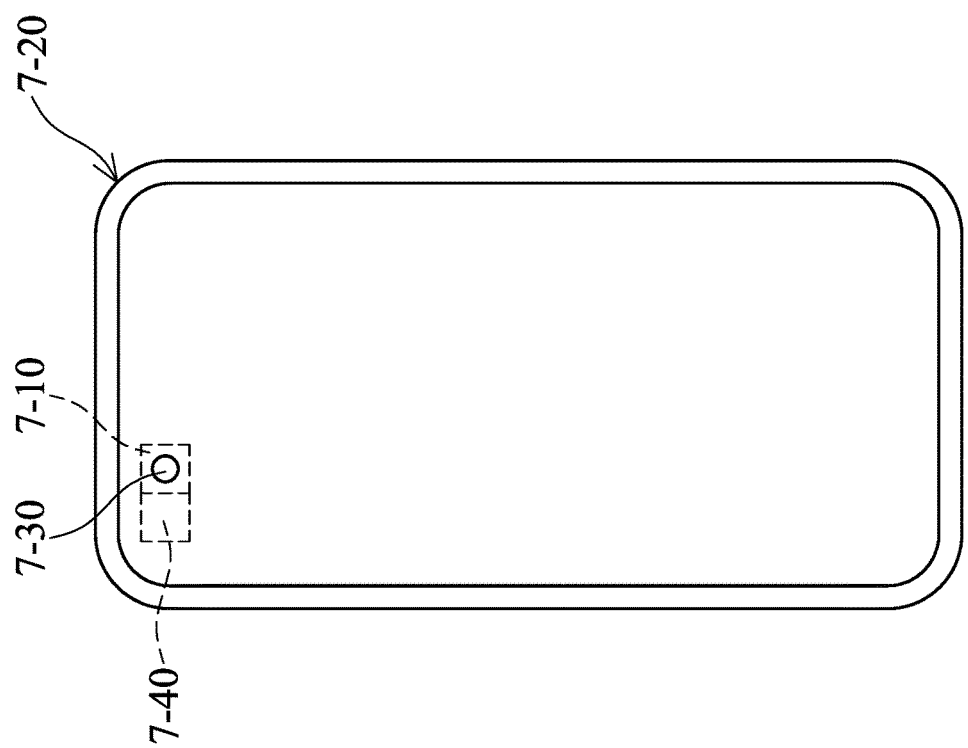
FIG. 1 is a schematic diagram of an electronic device according to an embodiment of the invention.

Referring to FIG. 1, in an embodiment of the invention, an optical member driving mechanism 7-10 can be disposed in an electronic device 7-20. The optical member driving mechanism 7-10 is configured to hold an optical member 7-30 and drive the optical member 7-30 to move relative to an image sensor module (not shown) in the electronic device 7-20, so as to achieve the purpose of focus adjustment. For example, the electronic device 7-20 can be a digital camera or a smart phone having the function of capturing photographs or making video recordings, and the optical member 7-30 can be a prism or a mirror. When capturing photographs or making video recordings, a light enters the optical member driving mechanism 7-10 along an incident direction (−Z-axis), and after reflected by the optical member 7-30, the light moves along an outgoing direction (−Y-axis) through an optical system 7-40 in the electronic device 7-20 and reach the image sensor module. The optical system 7-40 is configured to focus or adjust the light path, and can be adjusted or omitted as required.

Figure 2:
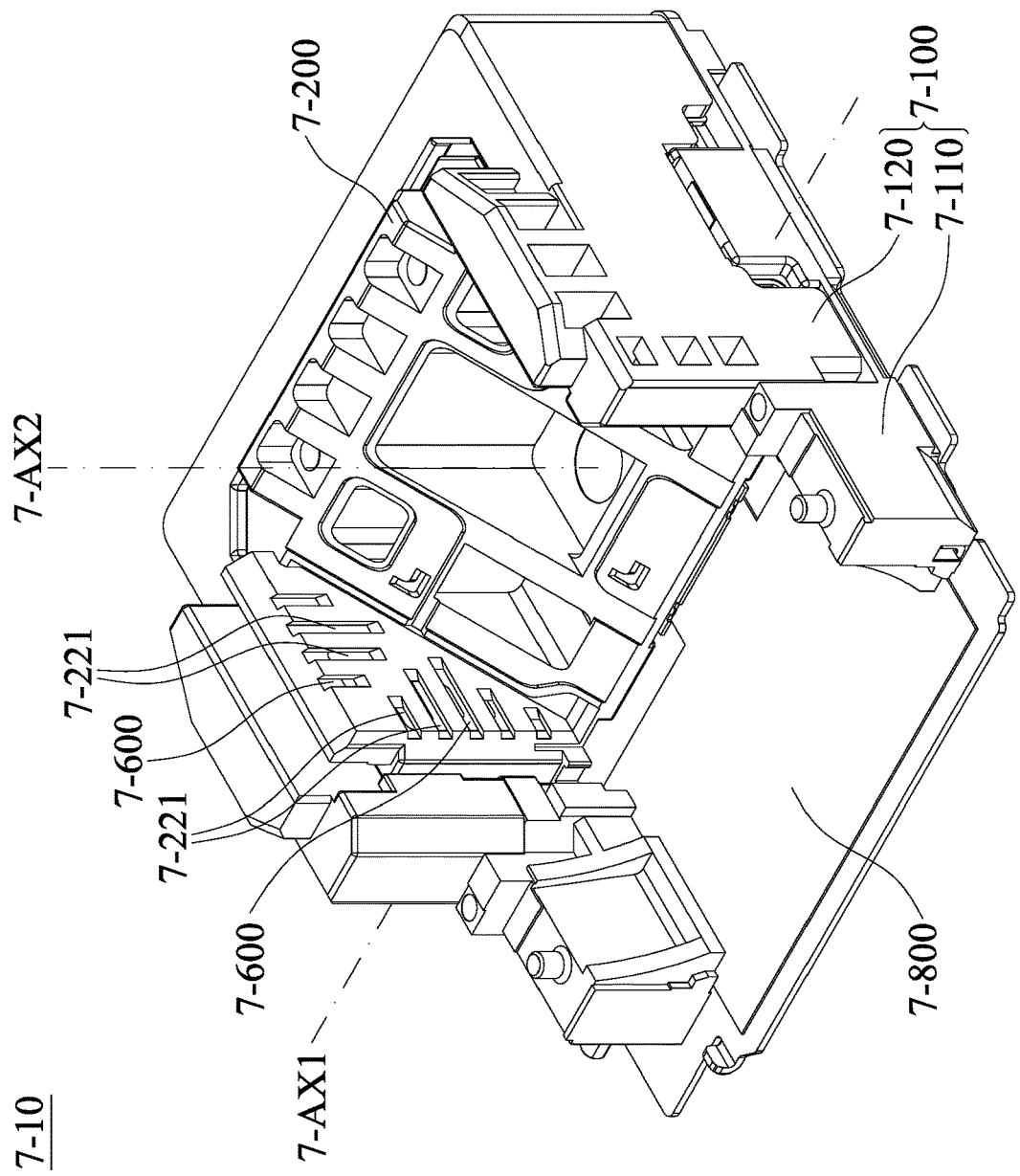
FIG. 2 is a schematic diagram of an optical member driving mechanism according to an embodiment of the invention.
Figure 3:
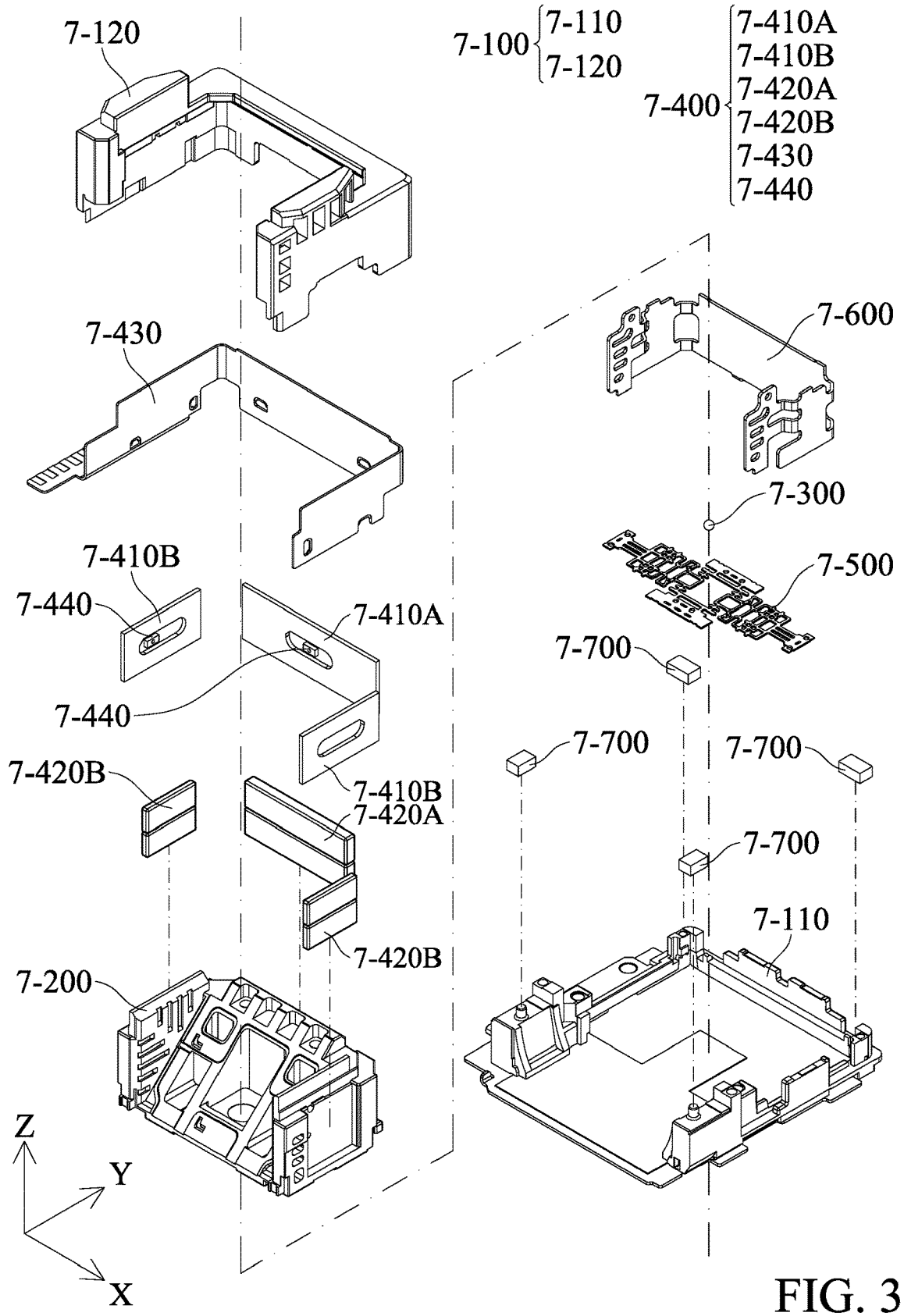
FIG. 3 is an exploded-view diagram of the optical member driving mechanism according to an embodiment of the invention.

Referring to FIGS. 2 and 3, the optical member driving mechanism 7-10 primarily includes a fixed portion 7-100, a movable portion 7-200, a supporting member 7-300, a driving assembly 7-400, an elastic member 7-500, a magnetic permeability member 7-600, and a plurality of damping members 7-700.

Figure 5:
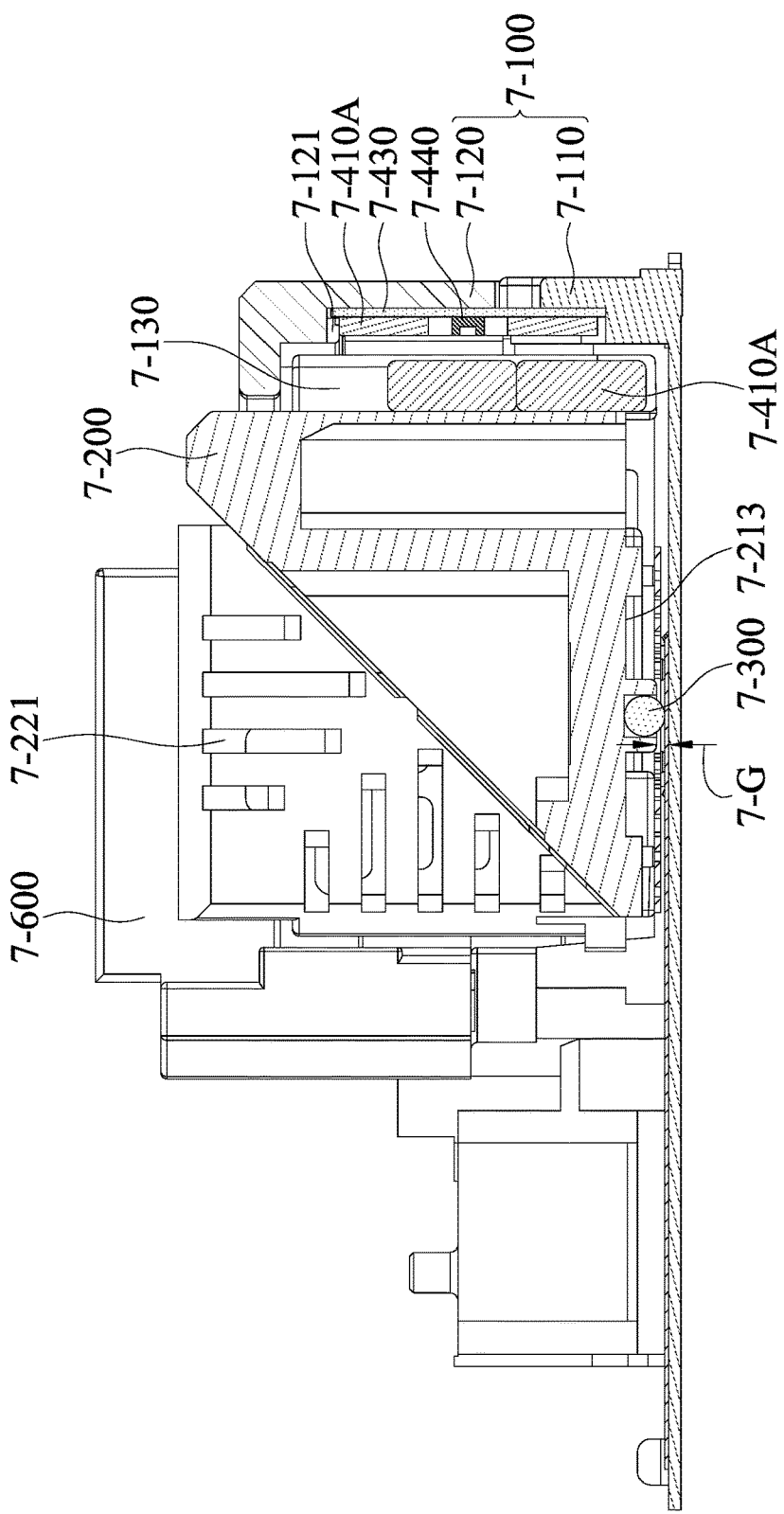
FIG. 5 is a cross-sectional view of the optical member driving mechanism according to an embodiment of the invention.

The fixed portion 7-100 includes a base 7-110 and a housing 7-120. The base 7-110 and the housing 7-120 can be assembled using snap-fit joints or adhesive member, and an accommodating space 7-130 can be formed after assembled (as shown in FIG. 5). The movable portion 7-200 can be an optical member holder, and the optical member 7-30 is disposed on the movable portion 7-200. When the movable portion 7-200 is movably connected to the fixed portion 7-100, the movable portion 7-200 and the optical member 7-30 are accommodated in the accommodating space 7-130 of the fixed portion 7-100.

Figure 4A:
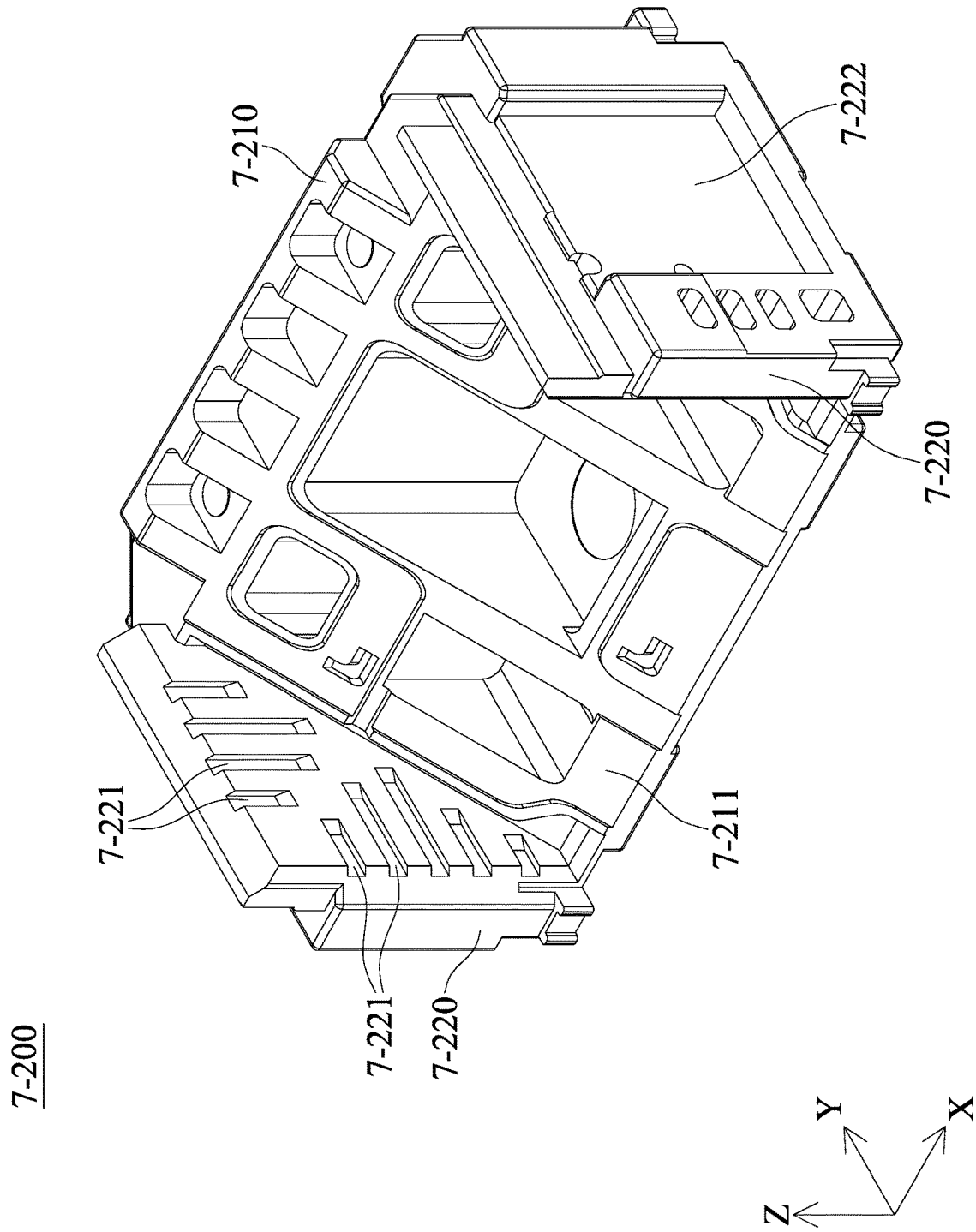
FIG. 4A is a schematic diagram of a movable portion according to an embodiment of the invention.
Figure 4B:
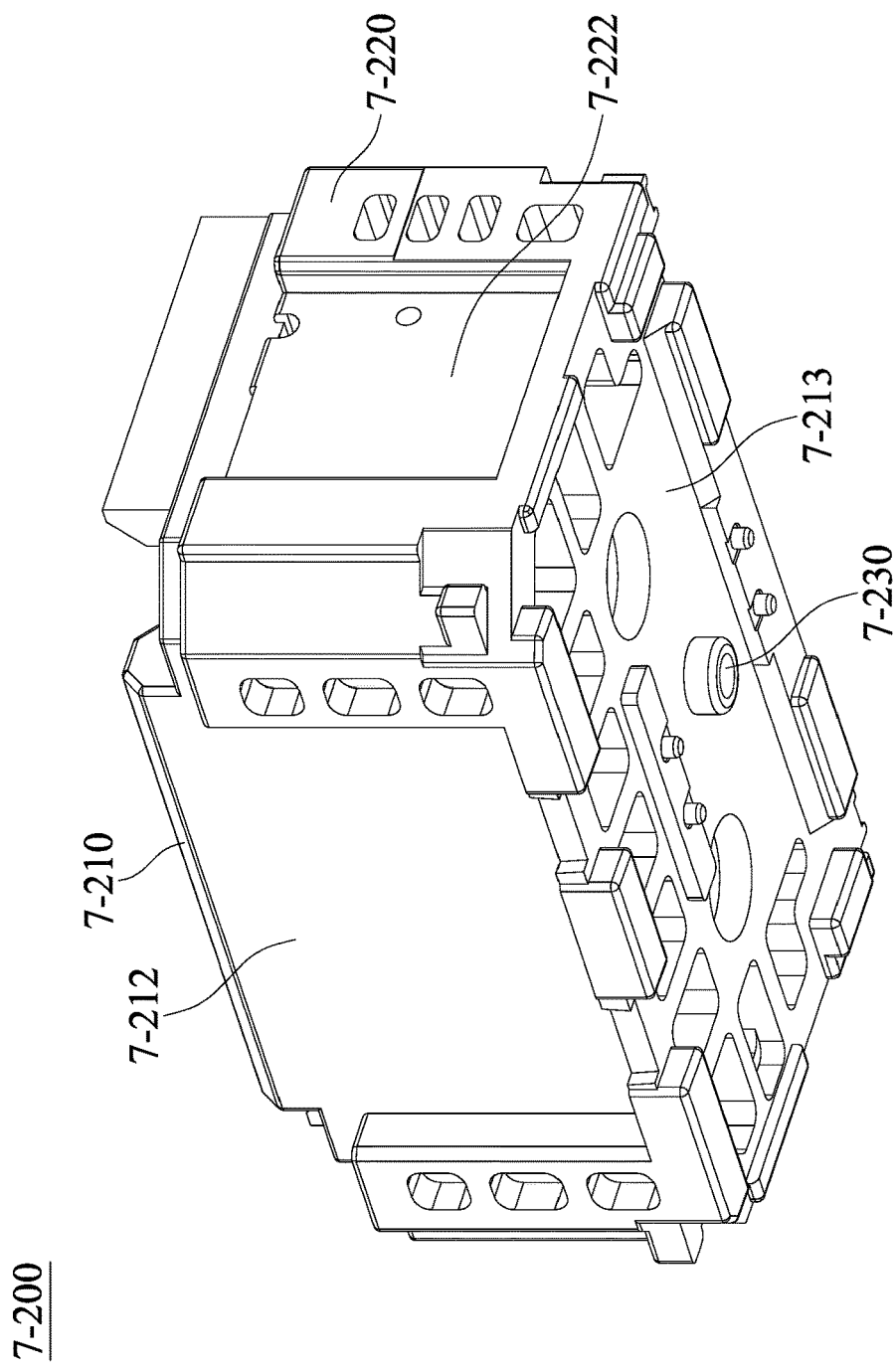
FIG. 4B is a schematic diagram of the movable portion in another view according to an embodiment of the invention.

As shown in FIGS. 4A and 4B, the movable portion 7-200 includes a main body 7-210 and two lateral walls 7-220 respectively connected to opposite sides of the main body 7-210. A plurality of grooves 7-221 are formed on the inner surface of each of the lateral walls 7-220. The user can dispose the optical member 7-30 on the inner surface 7-211 of the main body 7-210, and then infuse adhesive glue into the grooves 7-221. Thereby, the optical member 7-30 can be affixed to the movable portion 7-200.

The longitudinal direction of the grooves 7-221 can be different to ensure that the optical member 7-30 will not separate from the movable portion 7-200 when external forces in various directions applied thereon. For example, in this embodiment, the movable portion has a plurality of grooves 7-221 having longitudinal direction along the Z-axis and a plurality of grooves 7-221 having longitudinal direction along the Y-axis. When the user infuses adhesive glue into the grooves 7-221 having longitudinal direction along the Z-axis, adhesive glue can provide a sufficient adhesive force to the optical member 7-30 to ensure that an external force in Y-axis cannot separate the optical member 7-30 from the movable portion 7-200. When the user infuses adhesive glue into the grooves 7-221 having longitudinal direction along the Y-axis, adhesive glue can provide a sufficient adhesive force to the optical member 7-30 to ensure that an external force in Z-axis cannot separate the optical member 7-30 from the movable portion 7-200.

A depression 7-222 is formed on the outer surface of each of the lateral walls 7-220, and a depression 7-212 is formed on the outer surface of the main body 7-210. Moreover, the main body 7-210 further includes an annular structure 7-230, disposed on the bottom surface 7-213 of the main body and protruding from the bottom surface 7-213.

As shown in FIGS. 3 and 5, the supporting member 7-300 can be a ball. After the optical member driving mechanism 7-10 is assembled, the supporting member 7-300 is disposed between the base 7-110 and the movable portion 7-200, and contacts the base 7-110 and the bottom surface 7-213 of the movable portion 7-200. Moreover, the supporting member 7-300 is surrounded by the annular structure 7-230.

Since the thickness of the supporting member 7-300 is greater than the thickness of the annular structure 7-230 in the Z-axis, the movable portion 7-200 is supported by the supporting member 7-300 and does not contact the base 7-110. A gap 7-G can be formed between the movable portion 7-200 and the base 7-110.

Referring to FIGS. 3 and 5-7, the driving assembly 7-400 includes first electromagnetic driving members 7-410A and 7-410B, second electromagnetic driving members 7-420A and 7-420B, a circuit board 7-430, and position sensors 7-440.

Figure 6:
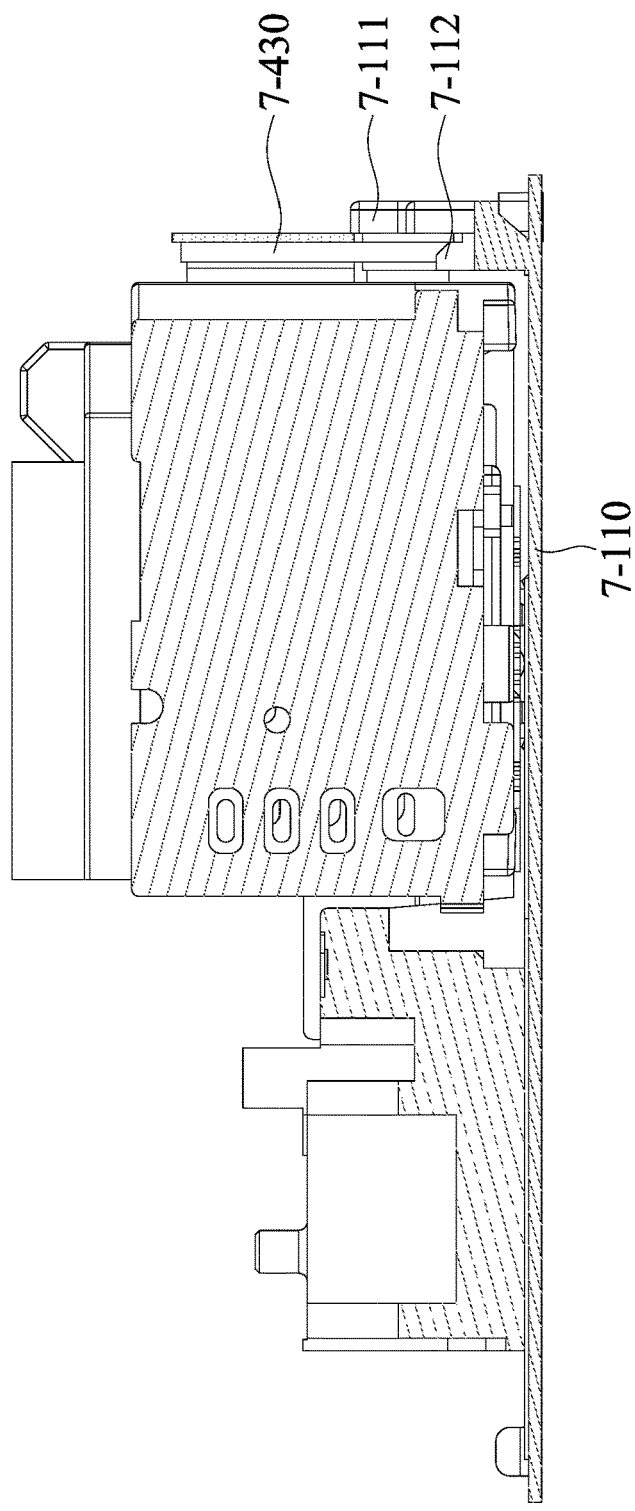
FIG. 6 is another cross-sectional view of the optical member driving mechanism according to an embodiment of the invention, wherein a housing is omitted.
Figure 7:
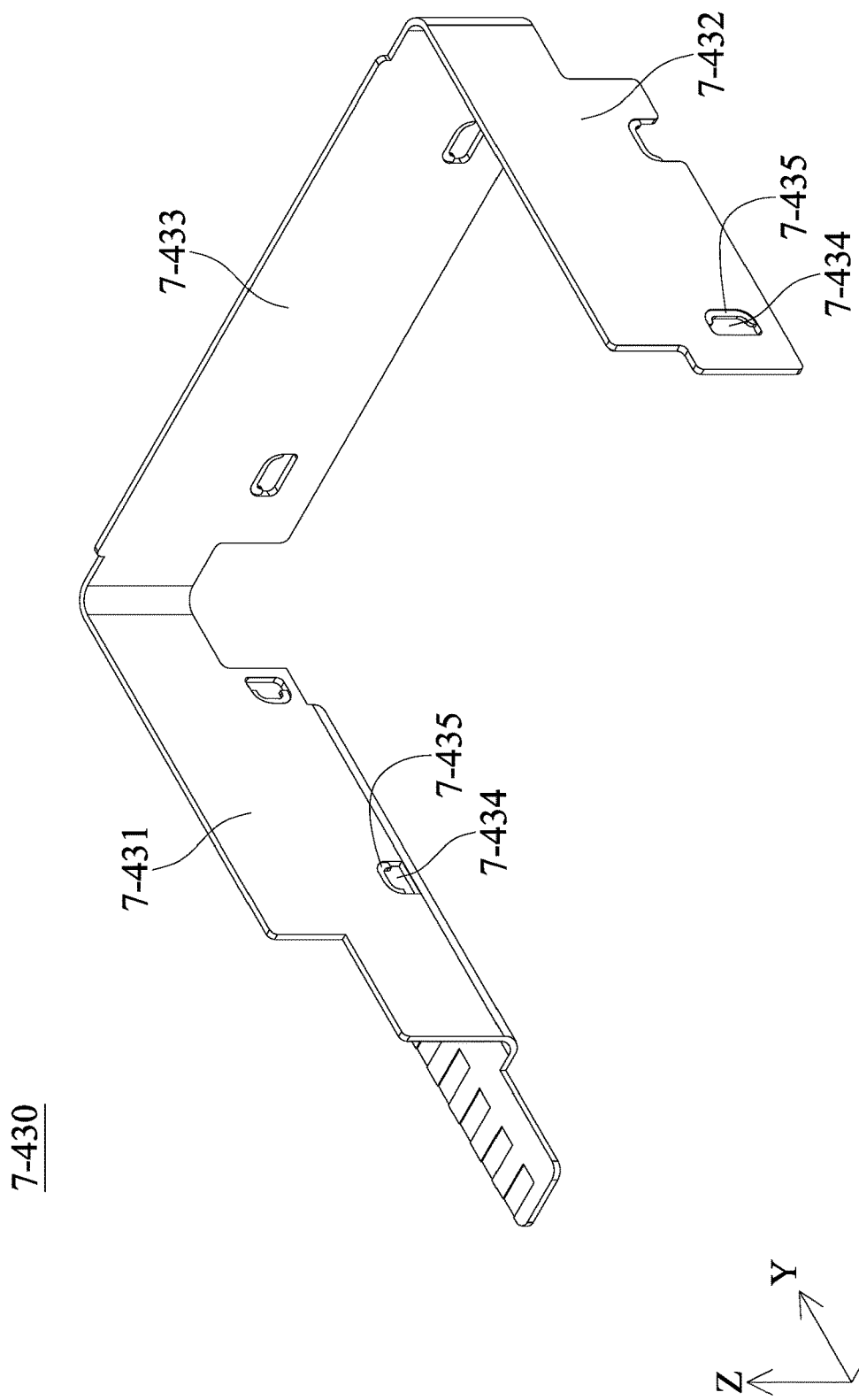
FIG. 7 is a schematic diagram of a circuit board according to an embodiment of the invention.

The circuit board 7-430 is affixed to the housing 7-120. As shown in FIG. 5, the housing 7-120 of the fixed portion 7-100 has a C-shaped structure 7-121. And upper side of the circuit board 7-430 enters the notch of the C-shaped structure 7-121 to position the circuit board 7-430. Similarly, as shown in FIG. 6, the base 7-110 of the fixed portion 7-100 has a first restricting portion 7-111 and a second restricting portion 7-112. The first restricting portion 7-111 and the second restricting portion 7-112 are extended toward the housing 7-120, and the distance between the first restricting portion 7-111 and the movable portion 7-200 is greater than the distance between the second restricting portion 7-112. When the circuit board 7-430 is disposed on the circuit board 7-110, the other side of the circuit board 7-430 is clamped between the first restricting portion 7-111 and the second restricting portion 7-112. Thereby, the circuit board 7-430 can be affixed and positioned by the C-shaped structure 7-121, the first restricting portion 7-111, and the second restricting portion 7-112.

Specifically, the second restricting portion 7-112 has a chamfer or a fillet facing the circuit board 7-430, so as to increase the area where can arrange the circuit and to prevent the circuit board 7-430 from scratching during assembly.

The circuit board 7-430 has a U-shaped structure. In other words, the circuit board 7-430 can be divided into a left segment 7-431, a right segment 7-432, and a middle segment 7-433. The middle segment 7-433 connects the left segment 7-431 to the right segment 7-432, and the normal direction of the middle segment 7-433 is different from the normal direction of the left segment 7-431 and the normal direction of the right segment 7-432. Furthermore, the circuit board 7-430 has a plurality of through holes 7-434, and at least a portion of the circuit 7-435 of the circuit board 7-430 is exposed from the through holes 7-434.

In this embodiment, the driving assembly 7-400 includes one first electromagnetic driving member 7-410A and two first electromagnetic driving members 7-410B. The first electromagnetic driving member 7-410A is disposed on the middle segment 7-433 of the circuit board 7-430, and two first electromagnetic driving members 7-410B are respectively disposed on the left segment 7-431 and the right segment 7-432 of the circuit board 7-430. The first electromagnetic driving members 7-410A and 7-410B can be coils, and can be connected to the circuit 7-435 at the through holes 7-434 by welding.

Figure 8:
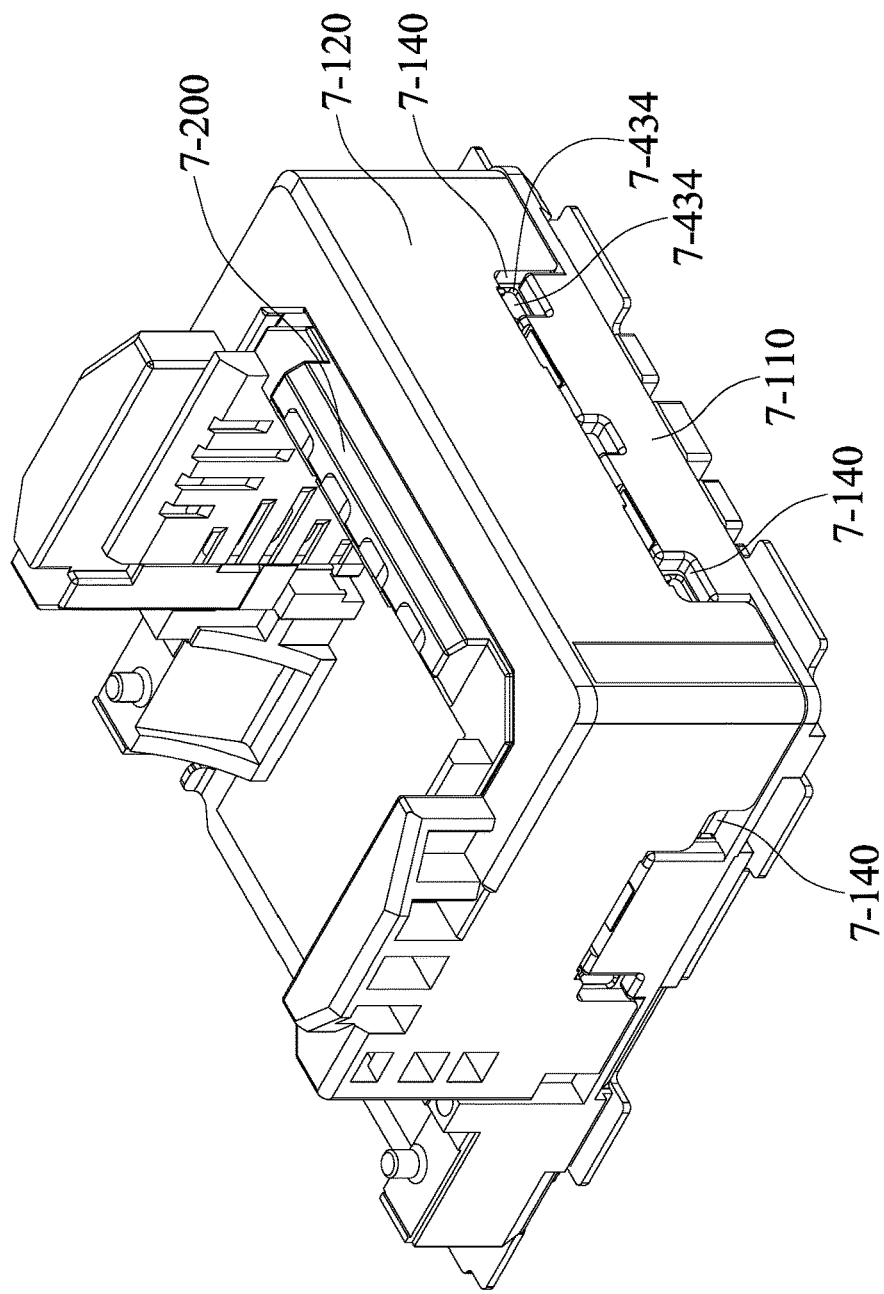
FIG. 8 is a schematic diagram of the optical member driving mechanism in another view according to an embodiment of the invention.

As shown in FIG. 8, when the base 7-110 and the housing 7-120 of the fixed portion 7-100 are joined together, one or more openings 7-140 is formed between the base 7-110 and the housing 7-120, and the positions of the openings 7-140 correspond to the positions of the through holes 7-434. The user can fill the adhesive member (such as a glue, not shown) into the opening 7-140, so that the base 7-110, the housing 7-120, the circuit board 7-430, and the first electromagnetic driving members 7-410A and 7-410B can be affixed more securely.

In some embodiments, the first electromagnetic driving members 7-410A and 7-410B can be mounted on the circuit board 7-430 by using surface-mount technology (SMT), and the through holes 7-434 can be omitted.

Figure 9A:
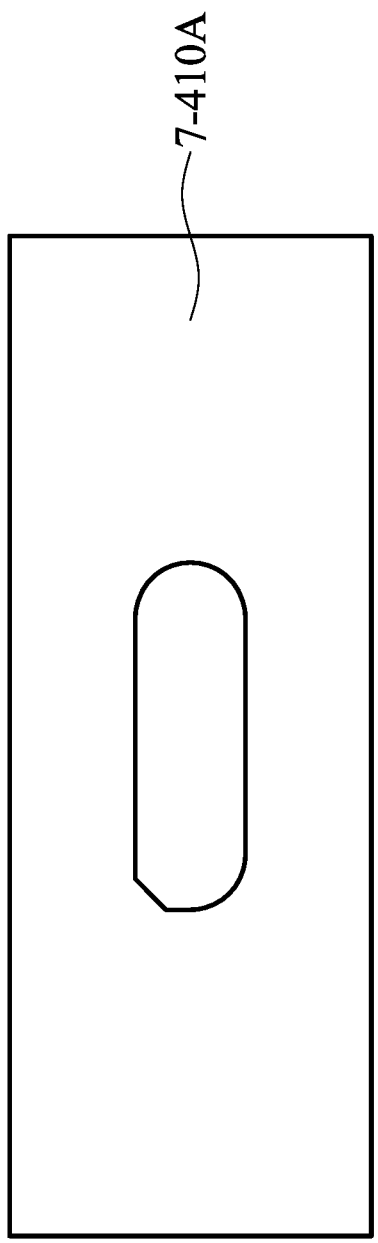
FIG. 9A is a schematic diagram of a first electromagnetic driving member according to an embodiment of the invention.
Figure 9B:
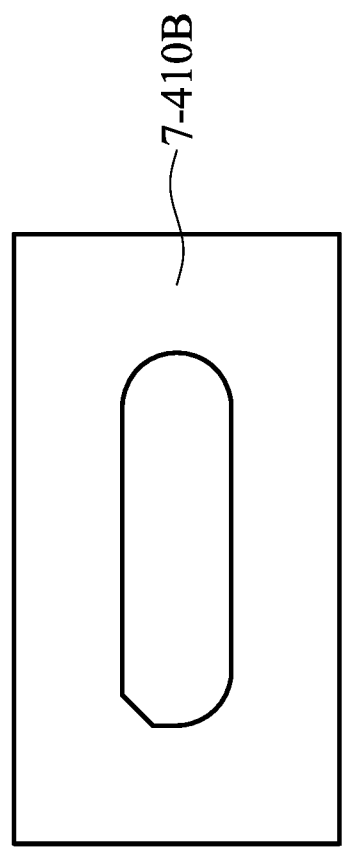
FIG. 9B is a schematic diagram of another first electromagnetic driving member according to an embodiment of the invention.

As shown in FIGS. 9A and 9B, the inside tracks of the first electromagnetic driving members 7-410A and 7-410B have asymmetric patterns, so as to ensure that the user mounts the first electromagnetic driving members 7-410A and 7-410B in the correct orientation.

Referring to FIGS. 3 and 5-7, the second electromagnetic driving members 7-420A and 7-420B are disposed on the movable portion 7-200, and the positions of the second electromagnetic driving members 7-420A and 7-420B respectively correspond to the positions of the first electromagnetic driving members 7-410A and 7-410B. The second electromagnetic driving member 7-420A can be disposed on the main body 7-210 of the movable portion 7-200, and the second electromagnetic driving members 7-420B can be disposed on the lateral walls 7-220 of the movable portion 7-200. In this embodiment, the second electromagnetic driving members 7-420A and 7-420B can be respectively accommodated in the depressions 7-212 and 7-222 of the movable portion 7-200, so as to miniaturize the optical member driving mechanism 7-10.

The second electromagnetic driving members 7-420A and 7-420B can be magnets. Since the first electromagnetic driving member 7-410A corresponds to the second electromagnetic driving member 7-420A, when a current flows through the first electromagnetic driving member 7-410A, an electromagnetic effect is generated between the first electromagnetic driving member 7-410A and the second electromagnetic driving member 7-420A, and the movable portion 7-200 is driven to rotate around a first rotation axis 7-AX1 relative to the fixed portion 7-100.

Similarly, since the first electromagnetic driving members 7-410B corresponds to the second electromagnetic driving members 7-420B, when current flow through the first electromagnetic driving members 7-410B, an electromagnetic effect is generated between the first electromagnetic driving members 7-410B and the second electromagnetic driving members 7-420B, and the movable portion 7-200 is driven to rotate around a second rotation axis 7-AX2 relative to the fixed portion 7-100. In this embodiment, the second rotation axis 7-AX2 is perpendicular to the first rotation axis 7-AX1.

Due to the rotation of the movable portion 7-200 relative to the fixed portion 7-100, the optical member 7-30 on the movable portion 7-200 can also rotate relative to the fixed portion 7-100. Thus, the emission direction of the reflected light can be lightly adjusted. In some embodiments, the first electromagnetic driving members 7-410A and 7-410B can be magnets, and the second electromagnetic driving members 7-420A and 7-420B can be coils.

The position sensors 7-440 are disposed on the circuit board 7-430, and the positions of the position sensors 7-440 correspond to that of the second electromagnetic driving members 7-420A and 7-420B. The position sensors 7-440 are configured to detect the position of the second electromagnetic driving members 7-420A and 7-420B, so as to obtain the rotation angle of the movable portion 7-200 relative to the fixed portion 7-100.

For example, the position sensors 7-440 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

The position sensors 7-440 are connected to the circuit board 7-430 through its pins. The user can fill insulation glue between the position sensors 7-440 and the circuit board 7-430 at the position without pins, so as to securely affix the position sensors 7-440.

Figure 10:
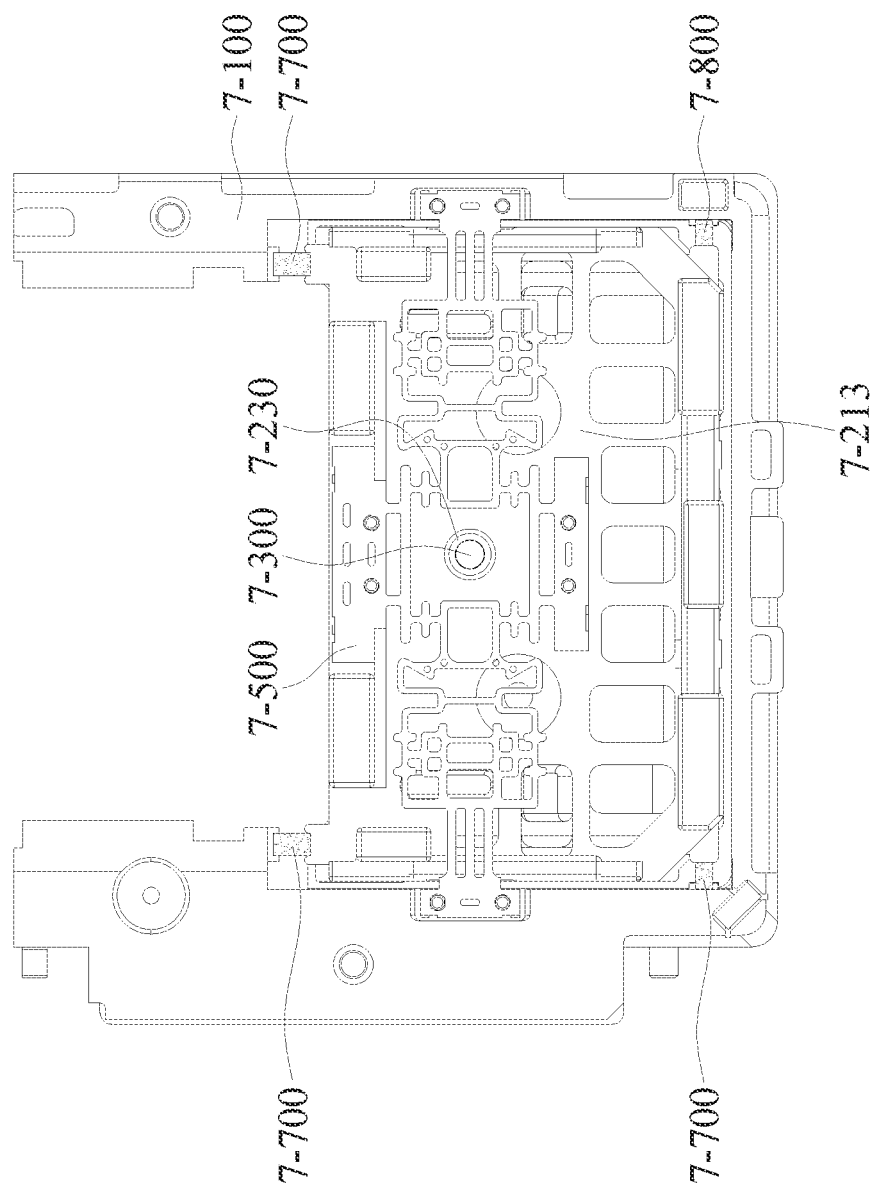
FIG. 10 is a bottom view of the optical member driving mechanism to an embodiment of the invention, wherein a base is omitted.

As shown in FIG. 10, the elastic member 7-500 is connected to the fixed portion 7-100 and the movable portion 7-200 to suspend the movable portion 7-200 in the accommodating space 7-130. The damping members 7-700 are disposed on the side of the movable portion 7-200 adjacent to the base 7-110, and situated at the corners of the movable portion 7-200. The damping members 7-700 can be connected to the fixed portion 7-100 and the movable portion 7-200, or disposed on the elastic member 7-500, so as to suppress the vibration during the rotation of the movable portion 7-200.

Figure 11:
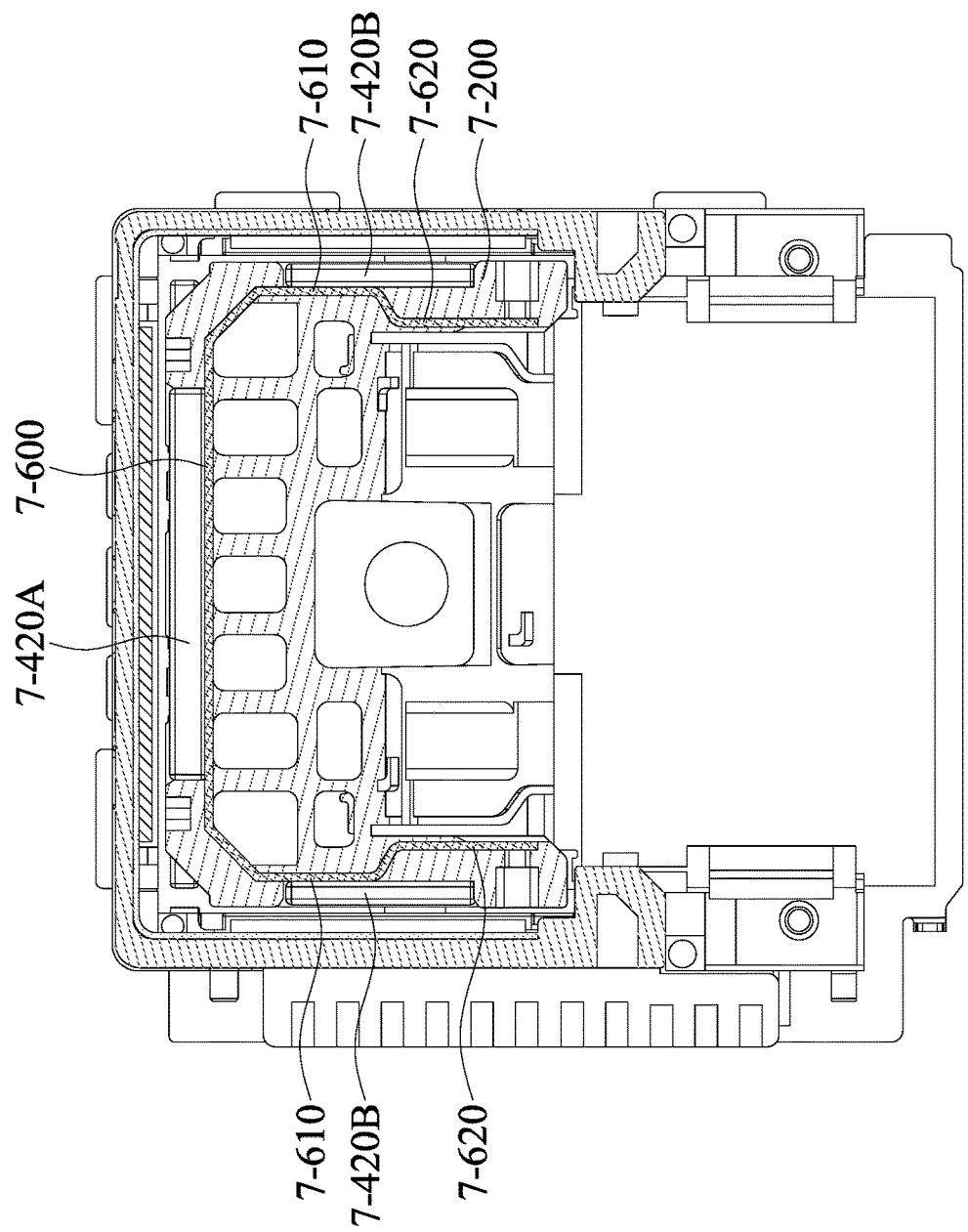
FIG. 11 is another exploded-view diagram of the optical member driving mechanism according to an embodiment of the invention.

Referring to FIGS. 2 and 11, the magnetic permeability member 7-600 is embedded in the movable portion 7-200, and has at least one connecting portion 7-610 and at least one curved portion 7-620. The connecting portion 7-610 is adjacent to the second electromagnetic driving member 7-420B, and the curved portion 7-620 is adjacent to the inner surface of the lateral wall 7-220 of the movable portion 7-200. In other words, the distance between the curved portion 7-620 and the inner surface of the lateral wall 7-220 of the movable portion 7-200 is less than the distance between the connecting portion 7-610 and the inner surface of the lateral wall 7-220 of the movable portion 7-200.

The portion of the magnetic permeability member 7-600 adjacent to the second electromagnetic driving members 7-420A and 7-420B (such as the connecting portion 7-610) can enhance the magnetic pushing force of the driving assembly 7-400. The curved portion 7-620 is exposed from the grooves 7-221 of the movable portion 7-200. Therefore, when the user infuse adhesive glue into the grooves 7-221 to attach the optical member 7-30, the adhesive force of adhesive glue is increased, and the optical member 7-30 can be affixed more securely.

Furthermore, a dark member 7-800 is disposed on the base 7-110 of the fixed portion 7-100. The dark member 7-800 is extended along the outgoing direction of the light, so as to reduce the stray light. In this embodiment, the dark member 7-800 extends to the position between the optical member 7-30 and the base 7-100.

In summary, an optical member driving mechanism is provided, including a movable portion, a fixed portion, and a driving assembly. The movable portion is connected to an optical member. The fixed portion has an accommodating space, and the optical member is received in the accommodating space. The movable portion is movable relative to the fixed portion. The driving assembly is configured to drive the movable portion to move relative to the fixed portion.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
   a movable portion, configured to connect an optical member;
   a fixed portion, having an accommodating space, wherein the optical member is received in the accommodating space, and the movable portion is movable relative to the fixed portion;
   a driving assembly, configured to drive the movable portion to move relative to the fixed portion; and
   a magnetic permeability member, embedded in the movable portion,
   wherein the movable portion has a plurality of grooves, and the magnetic permeability member is exposed from the grooves.

2. The optical member driving mechanism as claimed in claim 1, wherein and longitudinal directions of at least two grooves are different.

3. The optical member driving mechanism as claimed in claim 1, wherein the movable portion has an inner surface and the plurality of grooves formed on the inner surface, and the magnetic permeability member has a connecting portion and a curved portion connected to the connecting portion, wherein a distance between the curved portion and the inner surface is less than a distance between the connecting portion and the inner surface.

4. The optical member driving mechanism as claimed in claim 1, wherein the driving assembly comprises a magnet disposed on the movable portion, and at least a portion of the magnetic permeability member is adjacent to the magnet.

5. The optical member driving mechanism as claimed in claim 1, wherein the driving assembly comprises a circuit board, and the circuit board has a U-shaped structure.

6. The optical member driving mechanism as claimed in claim 1, wherein the driving assembly comprises a circuit board, the circuit board has a through hole and a circuit, and a portion of the circuit is exposed from the through hole.

7. The optical member driving mechanism as claimed in claim 6, wherein the driving assembly further comprises a coil, and the coil and the circuit are connected at the through hole by welding.

8. The optical member driving mechanism as claimed in claim 7, wherein the fixed portion comprises an opening, and the through hole is aligned with the opening.

9. The optical member driving mechanism as claimed in claim 8, wherein the optical member driving mechanism further comprises an adhesive member filled into the opening.

10. The optical member driving mechanism as claimed in claim 1, wherein the driving assembly comprises a circuit board and a coil, and the circuit board and the coil are electrically connected to each other using surface-mount technology.

11. The optical member driving mechanism as claimed in claim 1, wherein the driving assembly comprises a circuit board, the fixed portion comprises a housing having a C-shaped structure, and a side of the circuit board enters a notch of the C-shaped structure.

12. The optical member driving mechanism as claimed in claim 1, wherein the driving assembly comprises a circuit board, the fixed portion comprises a base having a first restricting portion and a second restricting portion, and the circuit board is clamped between the first restricting portion and the second restricting portion, wherein a distance between the first restricting portion and the movable portion is greater than a distance between the second restricting portion and the movable portion, and the second restricting portion has a chamfer or a fillet.

13. The optical member driving mechanism as claimed in claim 1, wherein the driving assembly comprises a coil, and an inside track of the coil has an asymmetric pattern.

14. The optical member driving mechanism as claimed in claim 1, wherein the optical member driving mechanism further comprises a plurality of damping members connected to the fixed portion and the movable portion, and the damping members are disposed on a side of the movable portion.

15. The optical member driving mechanism as claimed in claim 14, wherein the damping members are situated at corners of the movable portion.

16. The optical member driving mechanism as claimed in claim 1, wherein the optical member driving mechanism further comprises a dark member, the fixed portion comprises a base, and the dark member is disposed on the base.

17. The optical member driving mechanism as claimed in claim 16, wherein the dark member extends to a position between the base and the optical member.

* * * * *